United States Patent Office 3,538,438
Patented Nov. 3, 1970

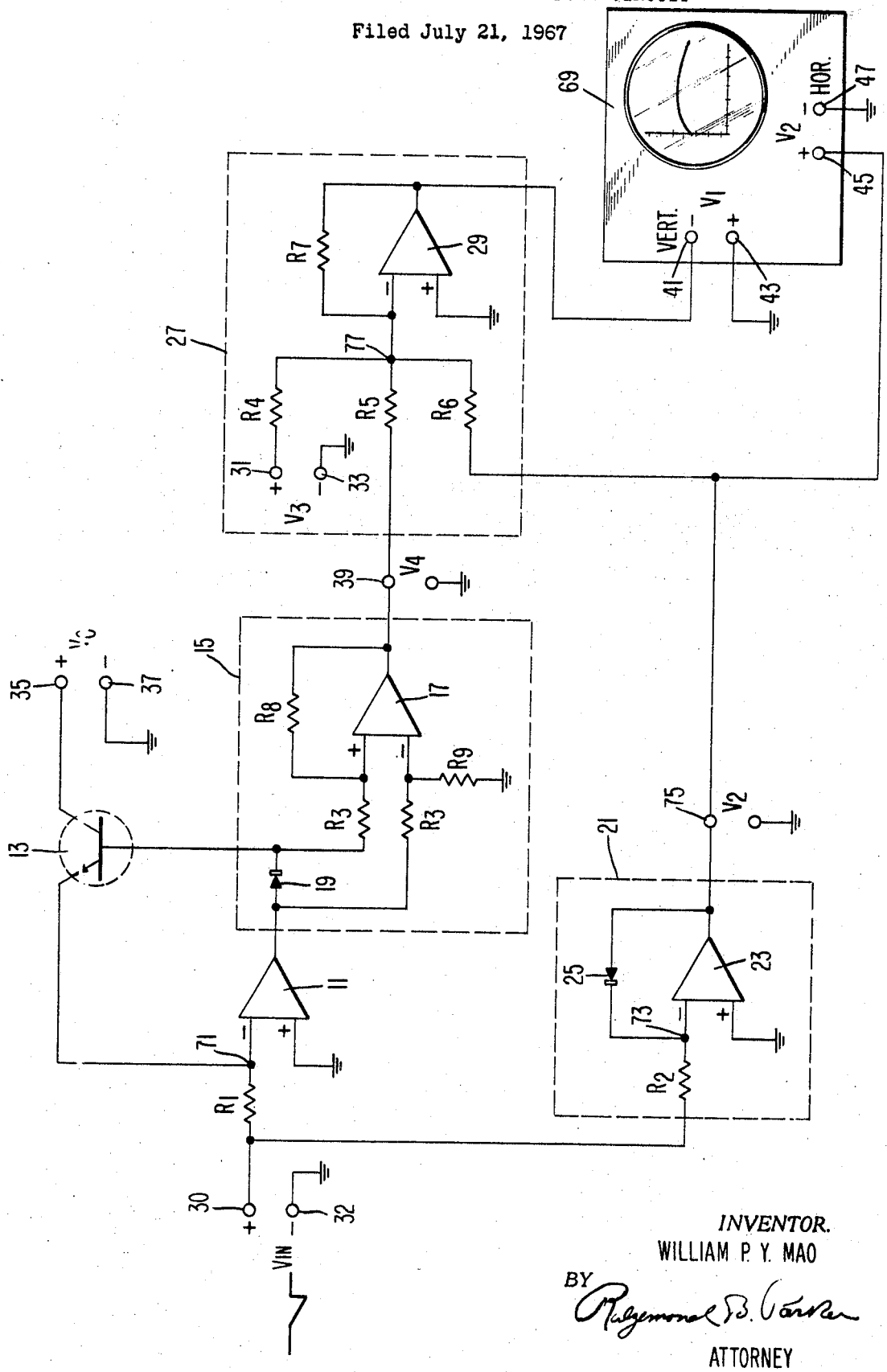

3,538,438
TRANSISTOR BETA TEST AND DISPLAY CIRCUIT
William Pai Yen Mao, Southfield, Mich., assignor to Burroughs Corporation, Detroit, Mich., a corporation of Michigan
Filed July 21, 1967, Ser. No. 655,041
Int. Cl. G01r 31/22
U.S. Cl. 324—158                                    4 Claims

ABSTRACT OF THE DISCLOSURE

An electronic circuit is disclosed for testing the DC common emitter current gain of a transistor at a constant collector to emitter voltage and providing an oscilloscope display of the current gain over a wide range of emitter currents. In this circuit, a saw-tooth shape current pulse is applied to the emitter of the transistor under test and to the base through an operational amplifier. The emitter and base currents are then monitored and converted to logarithmic functions by semiconductor elements. These two logarithmic functions are subtracted to perform a division of the two currents and the resulting voltage which indicates the log $(h_{FE}+1)$ is applied to the vertical input of the oscilloscope. At the same time, the logarithm of emitter current is applied to the horizontal input of the oscilloscope.

BACKGROUND OF INVENTION

This invention relates to a method of and apparatus for testing the forward current gain of a transistor. As part of the invention, electronic analog circuits are utilized for producing a voltage proportional to the quotient of two measured currents.

Because manufactured transistors have different characteristics, even among those produced in the same batch, it is common for persons using transistors in manufactured equipment to perform a test upon each transistor prior to its installation. Such testing is necessary to determine whether a given transistor has the required characteristics for use in a particular circuit. Since the current gain of a transistor is dependent upon the absolute current magnitude applied to it, it is desirable to determine the current gain at many different current levels. Presently available testers do not provide for directly displaying the current gain of a transistor over its full operating range.

Prior art testing devices can generally be classified in one of two groups. First, there are those devices which test the forward current gain characteristics of a transistor at a single operating point. These testers typically have fixed current sources and the collector to emitter voltage is used to indicate whether the current gain is larger than the ratio of collector to base current. Or, they may have a constant collector-to-emitter voltage and the base current is adjusted automatically or manually and then the current gain is calculated for each specific collector current condition. Since a transistor is seldom used at a single operating point, such a test serves only to get a general idea of the characteristics over the full operating range of the transistor or the test must be repeated many times at different operating points.

The second group of prior art devices produces an oscilloscope display of the volt-ampere characteristics over the full operating range of the transistor under test. These devices still have the disadvantage that further calculations are necessary to arrive at the forward current gain parameters. A reading of the currents and calculation of the current gain must be made at many operating points. A device for directly displaying the transistor characteristics over its full operating range, on the other hand, will immediately tell the operator what he desires to know concerning the transistor under test. This eliminates time consuming and possibly erroneous calculations.

One reason that prior art testing devices do not show current gain over the full operating range of the transistor is that the electronic calculating art does not teach a simple and accurate way for sensing two currents and dividing one by the other. The invention of such a technique was necessary in order to effect a display of transistor characteristics over a full operating range.

In addition to these difficulties in using presently available testers, many prior art display devices require two varying voltage sources, which must be operated in synchronism, one for each of two elements of the transistor under test. This makes the testing circuit complicated and subject to error. For simplicity and accuracy, a circuit requiring only a single varying external voltage source is preferable.

All testers for measuring the transistor characteristics under steady state conditions have the disadvantage of heating the transistor. As the transistor temperature goes up its amplifying characteristics become distorted. In such testers, then, the range of currents applied during the test must be limited, thereby having the disadvantage of not being able to measure the characteristics of the transistor over its full operating range.

SUMMARY OF INVENTION

The present invention has overcome all the above-mentioned disadvantages of the various prior art testing methods and apparatus. The forward current gain characteristics of a transistor under test are displayed on an oscilloscope or similar indicating device for the entire operating range of the transistor. A differential amplifier supplies a current to a first transistor element in the amount required as a result of the transistor current gain characteristics, in response to a single variable external voltage source applied to a second element of the transistor. The external variable voltage may be set to test the transistor over its full operating range. The invention includes means for sensing these two currents so supplied, and producing voltages proportional to the natural logarithm of the currents. Further means for subtracting one of these voltages from the other to effect a division of the currents is provided. The resulting voltage is displayed on an oscilloscope or similar device with a logarithmic scale, thereby effecting the taking of an antilogarithm. The result read is the ratio of two currents which is proportional to the forward current gain of the transistor. This current ratio may be visually displayed or otherwise detected for all operating points of the transistor, allowing the operator to determine the desired information very quickly.

The aforementioned differential amplifier and transistor cooperate in a novel manner to keep the second transistor element at substantially ground potential over the full operating range of the transistor. A constant voltage is applied to a third element of the transistor relative to ground. The result is a constant voltage between the second and third elements for the full range of currents to which the transistor is subjected. Further, this circuit concept requires only a single controlled voltage to supply the currents necessary for operation of the transistor.

It is desirable, in order to effectively display the information on an oscilloscope, that the external varying input voltage be a sawtooth-like waveform. This voltage may be of a low duty cycle without impairing the oscilloscope display, thus allowing the junction temperature of the transistors under test to remain substantially unaffected by the test current.

Each of the currents of the transistor elements to be measured is sensed and converted to a voltage that is a natural logarithm of these currents by means of a semiconductor junction element and detected by a differential type of operational amplifier. These two voltages are arithmetically combined by means of an operational amplifier summation circuit. Also injected into the summation circuit is a constant controlled voltage to compensate for the differences in the characteristics of the two semiconductor junction elements used for taking the logarithm of the two currents measured. Compensation for differences in the current measuring semiconductor elements is necessary for accurate mathematical operations. This invention includes an uncomplicated circuit that performs logarithmic mathematical operations as if its two current sensing semiconductor elements had exactly the same volt-ampere characteristics.

BRIEF DESCRIPTION OF THE DRAWING

The drawing discloses a preferred circuit embodiment of the invention and shows individual apparatus blocks in dotted outline for performing the mathematical manipulation.

DESCRIPTION OF THE PREFERRED EMBODIMENT

The preferred embodiment of the invention as shown in the drawing is designed to measure the common emitter forward current gain of a transistor under test. This transistor parameter is displayed on the vertical of an oscilloscope with the transistor's emitter current being applied in logarithmic form to the horizontal of the oscilloscope. The common emitter forward current gain of a transistor, denoted as $\beta$ or $h_{FE}$, is defined as the collector current ($I_C$) divided by base current ($I_B$) with the collector voltage held constant. For reasons hereafter explained, in the embodiment shown in the drawing the emitter current ($I_E$) is measured instead of $I_C$. This is still useful for determining the desired current gain characteristics since the ratio $I_E/I_B$ equal $h_{FE}+1$. This is derived by combining the $h_{FE}$ definition and the transistor current balance characteristic equation, $I_E = I_C + I_B$.

Referring to the drawing, the circuit will be described generally. Differential or operational amplifier 11 supplies base current to the transistor 13 under test responsive to the external voltage $V_{IN}$ applied at terminals 30 and 32. Block 21 senses the emitter current supplied from this external source, functions to produce an output voltage $V_2$ proportional to the natural logarithm of the emitter current, and applies this voltage to the horizontal inputs 45 and 47 of oscilloscope 69. Block 15 senses the base current and produces an output voltage $V_4$ which is proportional to the natural logarithm of the base current. Block 27 combines the voltages $V_2$ and $V_4$, taking the difference between these voltages, and applies its output $V_1$ to the vertical inputs 41 and 43 of the oscilloscope 69. Voltage $V_3$ is applied to block 27 to compensate for the difference in logarithmic conversion characteristics of blocks 21 and 15. The resulting oscilloscope display is the natural logarithm of ($h_{FE}+1$) displayed along the vertical against the natural logarithm of $I_E$ along the horizontal. The antilogarithm may be taken by appropriate scales on the oscilloscope tube. The tester operator has displayed before him the forward current gain for all operating points of the transistor under test and may thereby make a quick choice as to whether the transistor will operate properly in the circuit being built.

The embodiment of the invention shown in the drawing for testing the characteristics of NPN transistors will now be explained in more detail. The output of the differential amplifier 11 supplies current through diode 19 to the base of the transistor under test 13. The emitter of transistor 13 is connected to one input of amplifier 11. A variable voltage source connected between terminals 30 and 32 creates a current through $R_1$ to the same input of amplifier 11, designated terminal 71. The second input of amplifier 11 is placed at ground potential. The emitter current of transistor 13, then, is equal to $V_{IN}/R_1$.

To understand the operation of amplifier 11, consider input voltage $V_{IN}$ increasing from one level to another which will in turn place terminal 71 for a short instant at some voltage away from ground potential. As this happens, the output of amplifier 11 will increase since the voltage between its inputs is increasing. The increased base current applied to transistor 13 will cause the emitter current to increase to a steady state value which depends upon the characteristics of transistor 13. As the emitter current so increases, the voltage drop across $R_1$ will increase, thereby driving the voltage of terminal 71 again very near ground potential. It is desirable that amplifier 11 have a very large gain so the input difference voltage for all operating levels of transistor 13 may be very small but still provide the required base current at the output of amplifier 11.

If amplifier 11 is also chosen to have a very fast response time, $V_{IN}$ with a sawtooth waveform will provide required currents for both the emitter and the base of the transistor under test. A typical $V_{IN}$ will be a sawtooth pulse width of 500 microseconds and a duty cycle of 2%, chosen for low average current to minimize transistor heating. A separate base supply, as required in many prior art display devices, is not necessary. Further, since terminal 71 is kept substantially at ground potential and terminal 35, the positive collector terminal as explained hereinafter, is kept at a constant voltage in relation to ground, the collector-to-emitter voltage remains substantially constant while the full range of operating currents is applied to the transistor.

From this basic transistor supply circuit the base and emitter currents are independently measured and electronically divided for application to the oscilloscope display unit. The base current is sensed and converted to a logarithmic function by placing a semiconductor element, such as diode 19 poled with its anode toward the base of transistor 13, in series with the base with the voltage drop across the semiconductor element providing the desired logarithmic function. As one ordinarily skilled in the art will recognize, the equation relating the current through and voltage drop across an ideal semiconductor diode is:

(1) $\qquad I_d = I_{sat} e^{qV_d/nkT}$ when $V_d$ is greater than 0.1 volt, where:

$k$ = the Boltzmann constant, $1.38 \times 10^{-16}$ ergs per degree Kelvin
$T$ = absolute temperature, degrees Kelvin
$q$ = electronic charge, $1.602 \times 10^{-19}$ coulomb
$n$ = an empirical factor near unity, dependent upon the semiconductor junction characteristics.

If we let $a = nkT/q$ we see that:

(2) $\qquad V_d = a(\ln I_d - \ln I_{sat})$

Therefore, the voltage across diode 19 equals:

(3) $\qquad V_{d-19} = a_{19}(\ln I_B - \ln I_{sat-19})$

Differential amplifier 17 transfers this voltage drop across diode 19 to a voltage between terminal 39 and ground denoted as $V_4$, without loading down diode 19. The two inputs of amplifier 17 are connected on either side of diode 19 through equal resistors $R_3$. The feedback resistor $R_8$ connected between the output of amplifier 17 and one of its inputs determines the amplification factor of circuit 15. Since the real purpose of circuit 15 is to sense the voltage drop across diode 19 and create an equal output voltage in relation to ground potential, $R_8$ will generally be equal to $R_3$ in order that the gain of the circuit shall be unity. Feedback resistor $R_8$ is connected to the input of amplifier 17 that will result in the output voltage at terminal 39 being the desired polarity.

$R_9$ is connected between the other input of amplifier 17 and ground. With unity gain, the output voltage becomes:

(4) $\quad V_4 = -a_{19}(\ln I_B - \ln I_{sat-19})$

The circuit within block 21 serves to produce an output voltage $V_2$ which is proportional to the natural logarithm of the emitter current. Differential amplifier 23 has one input placed at ground potential and operates in cooperation with diode 25 in its feedback loop to keep the other input terminal 73 substantially at ground potential. Therefore, the input current to terminal 73 and thus through feedback diode 25 is equal to $V_{IN}/R_2$. Thus, the input current to this circuit is related to the emitter current of transistor 13 according to the ratio $R_1/R_2$. Based on the ideal diode characteristics expressed in Equation 1, it will be seen that:

(5) $\quad V_2 = a_{25}(\ln I_E - \ln I_{sat-25} - \ln K)$ where K is the ratio $R_2/R_1$.

In order to keep diode 25 from heating, the current through it is controlled to a fraction of $I_E$ by making $R_2$ several times the resistance value of $R_1$.

In the embodiment presently being described, $I_E$ is measured instead of $I_C$ since the measurement of $I_C$ may disturb the constant voltage characteristic between terminals 35 and 71 over the entire operating range of transistor 13. A diode in series with the collector would create a variable voltage drop resulting in the collector to emitter voltage being a function of the collector current, an undesirable characteristic sought to be eliminated. $I_E$ is sensed by the particular circuit configuration of block 21 in order to avoid placing the diode in series between terminals 30 and 71 which would place a further unknown impedance in the circuit and result in inaccuracies in the resulting measurements.

Block 27 combines the output voltages of blocks 15 and 21 along with that of a constant voltage source impressed at terminals 31 and 33. The voltages $V_2$, $V_3$, and $V_4$ are combined in an operational amplifier summation circuit which is well known in the art. This summation circuit produces the output voltage $V_1$. The logarithmic function voltages $V_2$ and $V_4$ are opposite in polarity so that their combination at point 77 results in a subtraction of these voltages and effects the desired division of the emitter and base currents of transistor 13. Feedback resistor $R_7$ placed in the feedback loop of amplifier 29, along with the input resistors $R_4$, $R_5$, and $R_6$ will determine the total amplification of the individual voltages applied to block 27 for summation, in a manner well known in the art.

An important aspect of the present invention is the application of $V_3$ between terminals 31 and 33 in block 27. The purpose of introducing this voltage is to compensate for the difference in characteristics of diodes 19 and 25 so that a subtraction of the logarithmic voltages produced by these diodes results in accurate and meaningful information. How this is accomplished and the value that $V_3$ should take may best be demonstrated by examining the basic mathematical relationships which the present circuit is designed to implement.

Recall, as developed hereinbefore:

(4) $\quad V_4 = -a_{19}(\ln I_B - \ln I_{sat-19})$ (5) $\quad V_2 = a_{25}(\ln I_E - \ln I_{sat-25} - \ln K)$ It can be seen from the drawing that:

(6) $\quad V_1 = -R_7/R_6\, V_2 - R_7/R_5\, V_4 - R_7/R_4\, V_3$ substituting Equations 4 and 5 into 6, (7) $\quad V_1 = -R_7/R_6\, a_{25}\,(\ln I_E - \ln I_{sat-25} - \ln K)$
$\quad\quad + \dfrac{R_7}{R_5} a_{19}\,(\ln I_B - \ln I_{sat-19}) - R_7/R_4\, V_3$ In order to eliminate variations among the terms so they may be combined, the relative resistor values of block 27 are made as follows:

(8) $\quad R_7/R_6 = 1/a_{25};\ R_7/R_5 = 1/a_{19};\ R_7/R_4 = 1$ substituting and regrouping, we have, (9) $\quad V_1 = \ln I_B - \ln I_E + (\ln I_{sat-25} - \ln I_{sat-} + \ln K) - V_3$ Therefore, the voltage applied in terminals 31 and 33 in order to cancel unwanted terms, is,

(10) $\quad V_3 = \ln I_{sat-25} - \ln I_{sat-19} + \ln K$ and the voltage applied to the oscilloscope by substituting Equation 10 in Equation 9 becomes,

(11) $\quad V_1 = \ln I_B - \ln I_E$
(12) $\quad V_1 = -\ln(h_{FE} + 1)$

The desired function.

Note by Equations 9 and 10 that $V_3$ compensates for the differences in saturation currents ($I_{sat}$), a constant that may vary between the two diodes used in the circuit. The ratio of feedback to input resistances in the summation circuit of block 27 compensates for the different values between diodes 19 and 25 of the exponential function of the diode characteristic Equation 1, expressed as the quantities $a_{19}$ and $a_{25}$ in Equations 4 and 5. It should be noted that this quantity $a$ is somewhat temperature dependent so compensating resistors $R_5$ and $R_6$ may be left slightly variable for further adjustment under varying testing conditions. It is readily seen, then, that insertion of the constant voltage $V_3$ and adjustment of the relative values of the resistances in block 27 compensates for any variations of $V_2$ and $V_4$ that might be due to a difference in characteristics between diodes 19 and 25. Therefore, block 27 produces an output $V_1$ which is proportional to the quotient of $I_E$ and $I_B$ and undistorted by such diode differences.

To further assure accuracy of the described circuit, differential amplifiers 11, 17, 23, and 29 must be capable of responding to voltage changes at their inputs without distortion. This requires reasonably fast amplifiers which are also stable and have a wide bandwidth. Many such amplifiers are commercial available. However, many amplifiers that satisfy these requirements have a relatively low current output. In certain testing circumstances, it may be desirable to increase the current output of the operational amplifiers. One such means for accomplishing this would be to add a simple emitter follower circuit at the output of the amplifiers to increase their current driving capability.

The preceding detailed discussion of the preferred embodiment of applicant's invention has described the circuit for testing the characteristics of an NPN transistor. Based on this description it should be obvious to those ordinarily skilled in the art that certain modifications may be made in order to test characteristics of PNP transistors and obtain the same beneficial results over present testing circuits. The external varying voltage $V_{IN}$, instead of being negative polarity as shown in the drawing would be made a positive polarity to drive the current in the proper direction for the PNP transistor 13. The polarity of the collector voltage $V_c$ as applied to terminals 35 and 37 would also have to be reversed. In block 15, diode 19 would have its polarity reversed, and in block 21, the polarity of diode 25 would be reversed. The applied voltage $V_3$ in block 27 would also have its polarity reversed. The result will be that the voltage applied to the oscilloscope will have opposite polarities than in the NPN case.

The embodiment hereinabove described is the preferred way to practice applicant's invention. Other embodiments and modifications may also become apparent to those skilled in the art. For instance, a steady voltage may be desired for $V_{IN}$ in order to determine the amplification of the transistor under test at a single operating point. Although there is the danger of overheating the semiconductor junction of the test transistor, applicant's invention would still provide the other advantages hereinabove described which are not found in present techniques and apparatus.

Another useful modification of the preferred embodiment may include a circuit for taking the antilogarithm of $V_1$ before application to the horizontal input of the oscilloscope. This would result in an oscilloscope display with a linear instead of a logarithmic scale.

Also, it is possible to use a meter in place of the oscilloscope for steady state testing where $V_{IN}$ is manually controlled. As a further modification, an antilogarithmic device could be inserted between block 27 and this meter to allow use of a linear meter scale.

Many variations in particular circuitry and types of elements to carry out this invention are possible without deviating from the true spirit and scope of this significant advance in the art as defined in the following claims.

I claim:
1. An electronic circuit for determining the characteristics of an electronic device with at least three elements such as a transistor, comprising:
   means for applying a constant voltage in relation to ground potential to a first element of said device;
   means for applying a periodic sawtooth waveform current to a second element of said device;
   differential amplifier means responsive to said sawtooth waveform current for supplying the necessary current to a third element of said device to keep the device in current balance;
   said differential amplifier means cooperating with said device to keep said second element substantially at ground potential;
   an oscilloscope with a first and second input for displaying characteristics of said device;
   means for converting said sawtooth waveform current into a voltage proportional to the natural logarithm of said current and applying said voltage to said first oscilloscope input;
   means for converting the current of said second element into a voltage proportional to the natural logarithm of said current; and
   means for arithmetically combining said voltage proportional to the current of said second element with said voltage proportional to the current of said third element and applying the combination to said second oscilloscope input.

2. In an apparatus for testing the characteristics of a three or more terminal electronic device by supplying current to a plurality of said terminals and for applying signals indicative of said characteristics to a display device, the improvement comprising:
   means including diodes for individually sensing the current at first and second terminals of said device and for converting each current into a voltage proportional to the logarithm of said current,
   said sensing and converting means including a first differential amplifier connected across one of said diodes and a second differential amplifier having another of said diodes in a feedback loop, and
   means for arithmetically combining said voltages to provide signals indicative of said characteristics, said combining means including an operational amplifier and means for compensating for the differences in the characteristics of said diodes.

3. The apparatus of claim 2 wherein a varying current is supplied to said first terminal of said device and including:
   means responsive to said varying current at said first terminal for automatically providing a varying current to said second terminal of said device for testing said device at steady state.
   said combining means thereby providing signals indicative of said characteristics substantially throughout the operating range of said device.

4. In an apparatus for testing the characteristics of a three or more terminal electronic device by supplying a varying current to said first terminal of said device and for applying signals indicative of said characteristics to a display device, the improvement comprising:
   means responsive to said varying current at said first terminal for automatically providing a varying current to said second terminal for testing said device at steady state,
   means including diodes for individualy sensing the current at first and second terminals of said device and for converting each current into a voltage proportional to the logarithm of said current,
   said sensing and converting means including a first differential amplifier connected across one of said diodes and a second differential amplifier having another of said diodes in a feedback loop, and,
   means for arithmetically combining said voltages to provide signals indicative of said characteristics.

References Cited

UNITED STATES PATENTS 2,244,369   6/1941   Martin.

OTHER REFERENCES

G. E. Transistor Manual (6th Edition), 1962, p. 229.
I.B.M. Technical Bulletin, "Automatic Beta Plotter" (Hilsenrath et al.), vol. 7, No. 9, February 1965, p. 750–51.
Electronic Engineering, "A Transistor Tester" (Winn), vol. 37, April 1965, pp. 234–35.

RUDOLPH V. ROLINEC, Primary Examiner

E. L. STOLARUN, Assistant Examiner

U.S. Cl. X.R.
324—57; 235—194